United States Patent [19]

Arrington

[11] Patent Number: 5,029,673

[45] Date of Patent: Jul. 9, 1991

[54] LUBRICATION SYSTEM FOR ROTARY CLAMP

[76] Inventor: James J. Arrington, 5316 Negley Ct., Columbus, Ohio 43232

[21] Appl. No.: 563,512

[22] Filed: Aug. 6, 1990

[51] Int. Cl.⁵ .......................................... F16N 21/00
[52] U.S. Cl. ............................. 184/105.3; 248/316.4
[58] Field of Search ............... 184/5, 105.1, 105.3; D7/376, 379; 248/231.6, 231.4, 316.6, 316.4

[56] References Cited

U.S. PATENT DOCUMENTS

| | | | |
|---|---|---|---|
| 2,272,636 | 2/1942 | Dennis | 184/105.1 |
| 2,339,439 | 1/1944 | Tone | D7/379 |
| 2,611,450 | 9/1952 | Kalikow | 184/105.3 |
| 4,070,711 | 1/1978 | Smader | 366/343 |
| 4,293,056 | 10/1981 | Setree, II | 184/105.3 |
| 4,378,136 | 3/1983 | Suzuki | 184/105.1 |

FOREIGN PATENT DOCUMENTS 0398911 3/1966 Sweden .................. 248/231.4

Primary Examiner—Ira S. Lazarus
Assistant Examiner—Alan B. Cariaso

[57] ABSTRACT

A rotary clamp mechanism for holding a food mixer bowl on a support arm, wherein a rotary clamp actuation shaft has an axial hole and three radial holes extending from the axial hole to supply lubricating grease to the shaft surface. A grease fitting extends into the end of the axial hole for pumping grease into the hole system.

2 Claims, 1 Drawing Sheet

LUBRICATION SYSTEM FOR ROTARY CLAMP

BACKGROUND AND SUMMARY OF THE INVENTION

This invention relates to a clamp construction especially useful for clamping a food mixer bowl in a stationary position on a bowl-supporting stand.

Food mixing equipment is often used in bakeries, restaurants and pizza shops for mixing ingredients used to make bread, cakes, pizzas, etc. A typical mixer comprises a vertical axis agitator (beater) adapted to extend downwardly into a circular bowl containing the ingredients to be mixed. The bowl is removably supported on a horizontal semi-circular arm structure. Two manually-operated clamp mechanisms are carried on the bowl for firmly holding the bowl in place on the supporting arm structure while the agitator is in operation.

Many of these mixing machines are equipped with timer devices for automatically controlling the agitation period. During the agitation period the equipment may remain unattended Therefore it is desirable to have a bowl-clamping mechanism that is very reliable and resistant to vibration forces associated with agitator operations.

A typical bowl-clamping mechanism comprises a rotary shaft having a clamping jaw thereon adapted to register with a rib projecting from the bowl. Manual rotation of the shaft in one direction causes the associated jaw to rotate around the shaft axis so as to overlie the rib on the bowl. Rotation of the shaft in the other direction causes the jaw to move away from the rib on the bowl, thereby enabling the bowl to be lifted off a stationary support structure underlying the rib.

The food mixer bowl has two external clamp mechanisms thereon at two diametrically spaced points on the bowl surface. Each clamp mechanism has its own operating handle. When the two handles are operated in the clamping direction the rotary clamping jaws are advanced to positions overlying the rib along opposite sides of the bowl, thereby locking the bowl in a fixed position on a bowl-support arm structure. When the two handles are operated in the reverse (unclamping) direction the clamping jaws are released from pressure engagement with the bowl rim.

These food mixers operate in an environment containing airborne particulates and liquids (e.g. flour, sugar, condiments, milk, water, etc.). Such materials can, overtime, migrate into the sliding interfaces within the bowl clamping mechanisms, thereby interfering with rotary motions of the mechanisms and in some cases shortening the service life of the equipment.

The present invention contemplates a novel lubrication system for the bowl clamping mechanisms. The lubrication system includes an arrangement of lubrication holes designed to produce an even distribution of grease onto different areas of the interface between each rotary shaft and the associated cylindrical bore in which the shaft is mounted. The preferred grease will be a grease material approved by the Food and Drug Administration for use in food processing equipment.

THE DRAWINGS

DESCRIPTION OF A PREFERRED EMBODIMENT OF THE INVENTION

Figure 1:
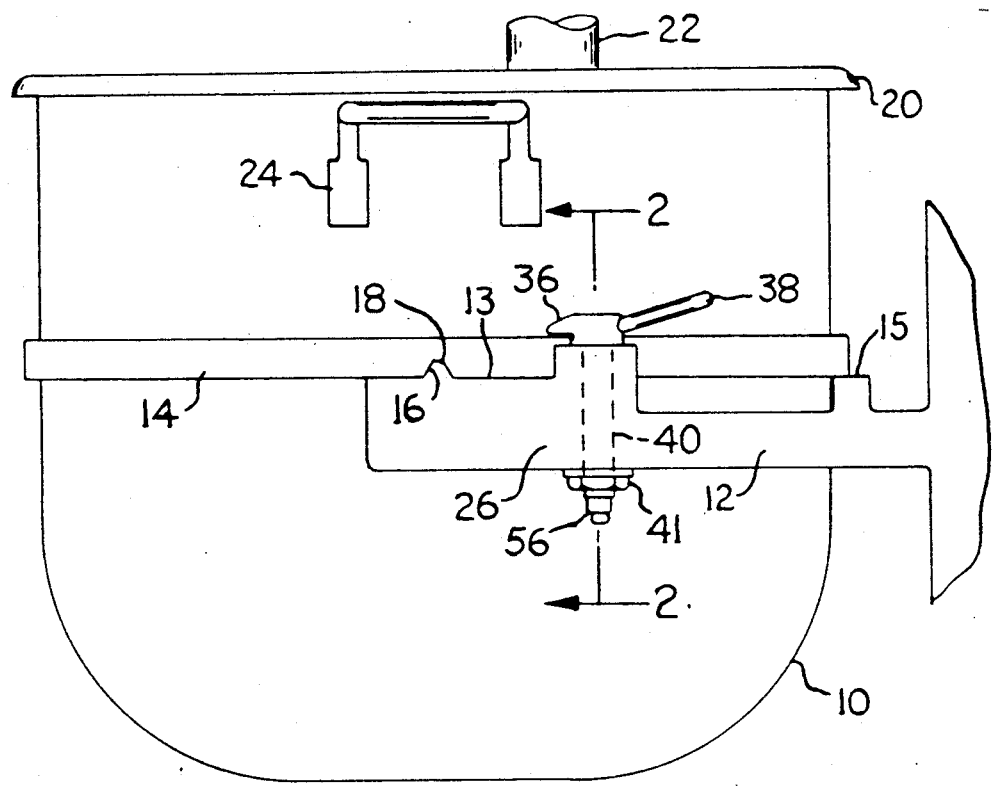
FIG. 1 is a fragmentary side elevational view of a power-operated food mixer having bowl clamping mechanisms constructed according to the invention.

FIG. 1 shows a food mixer that includes a circular metal bowl 10 supported on a horizontal semi-circular arm structure 12. This arm structure partially encircles the bowl to provide two bowl-support points 13 diametrically spaced on either side of the bowl, and a third immediate support point 15. The circular bowl has a rib or flange 14 adapted to rest on arm structure 12 at the three support points.

The bowl is inserted onto arm structure 12 by moving the bowl in a left-to-right direction (FIG. 1). When the bowl is fully inserted into the semi-circular arm structure a notch 16 in rib 14 will register with an upstanding lug 18 on arm structure 12, thereby preventing the bowl from sliding off the arm structure in a right-to-left direction. The support structure shown in FIG. 1 is duplicated at the other non-illustrated side of the bowl.

Bowl 10 has a reinforcement annular lip 20 at its upper edge. The space circumscribed by lip 20 is open to receive the ingredients that require mixing. The mixing operation is performed by a power-driven vertical axis agitator, shown fragmentarily at 22 in FIG. 1. The agitator extends near the bowl bottom wall. Two similarly constructed handles 24 are provided at diametrically spaced points on the bowl for lifting the bowl onto or off of arm structure 12.

Figures 2, 3:
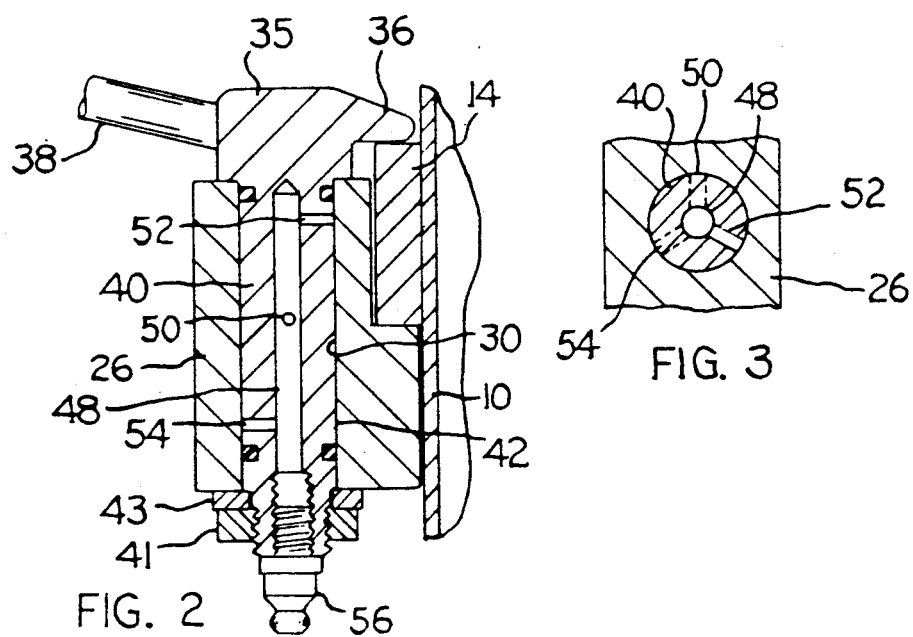
FIG. 2 is an enlarged fragmentary sectional view taken on line 2—2 in FIG. 1 but with the bowl clamp mechanism in a different position of adjustment.
FIG. 3 is a sectional view taken through a shaft used in the FIG. 2 clamp mechanism to illustrate a grease hole arrangement.

My invention is more particularly concerned with clamp mechanisms for clamping bowl 10 in a fixed position on arm structure 12. There are two such clamping mechanisms located near the diametrically spaced points 13 on the bowl. FIGS. 1 and 2 show one of the clamp mechanisms There is another clamp mechanism on the other side of the bowl; that other clamp mechanism will be the mirror image of the illustrate mechanism.

The illustrated clamp mechanism comprises a vertical shaft 40 extending downwardly through a circular (cylindrical) hole in section 26 of arm structure 12. An enlarged head 35 on shaft 40 includes a radially protruding jaw 36. As seen in FIG. 1 jaw 36 is spaced away from rib 14 on bowl 10. As seen in FIG. 2, jaw 36 extends over rib 14 to clamp the bowl in place on arm structure 12. A handle 38 is associated with head 35 for rotating shaft 40 and the associated jaw 36.

The lower end of shaft 40 is threaded to receive a nut 41; a washer 43 is sandwiched between the nut and the lower face of arm structure 12 such that shaft 40 can turn without becoming dislocated from the arm structure.

An axial hole 48 extends partway through shaft 40 from its lower threaded end. Three radial holes 50, 52 and 54 extend from hole 40 to the smooth cylindrical surface 42 on the shaft. Smooth shaft surface 42 and smooth hole surface 30 form a bearing system for rotatable support of shaft 40. Radial holes 50, 52 and 54 supply grease to the bearing interface.

FIG. 2 shows holes 50, 52 and 54 spaced axially along the length of the shaft bearing surface 42. FIG. 3 shows holes 50, 52 and 54 equidistantly spaced in the circumferential direction. The aim is to provide a fairly even distribution of grease along and around the shaft surface. The drawing shows three radial holes, but it is believed that different numbers of radial holes can be used. At least two radial holes are contemplated for achievement of a satisfactory grease film on the bearing surfaces.

Grease can be supplied to the confined space defined by axial hole 48 and radial holes 50, 52 and 54 through a grease fitting 56 mounted on the lower end of shaft 40. The shaft has an internally threaded hole (counterbore) to receive the threaded end of the grease fitting. The grease fitting can be a commercial item. U.S. Pat. No. 2,611,450 shows one form that the grease fitting could take. A grease gun, not shown, can be connected to fitting 56 to pump grease into axial hole 48 should the quantity of grease in the confined space become less than adequate for lubrication purposes.

My invention relates principally to the system of holes 48, 50, 52 and 54 for ensuring the presence of a lubricant film in the rotary interface between bearing surfaces 30 and 42. The grease film promotes easy rotary motion of each clamp element. The grease film also tends to exclude foreign particulates from entering into the shaft-hole clearance. In this sense the grease film prevents abrasive wearing away of the shaft surface thereby increasing the service life of the clamp mechanism.

I claim:

1. In a food mixer that includes a bowl having a rib (14) projecting therefrom, and an arm structure (12) adapted to underlie the rib to support the bowl; the improvement comprising a manually-operated clamp mounted on the arm structure for holding the rib against the arm structure; said clamp comprising a first vertical hole in the arm structure, a rotary shaft (40) extending downwardly through said first hole, and a jaw (36) protruding from the upper end of the shaft to overlie the rib when the shaft is rotated to a predetermined position; said shaft having a second axial hole (48) therein, and at least two radial holes extending from said axial hole at axially spaced points therealong; and a grease fitting (56) threadably mounted on the lower end of said shaft to close the axial hole, such that grease can be pumped through the fitting into the axial hole and the associated radial holes.

2. The improvement of claim 1, wherein said shaft includes an externally threaded section protruding downwardly below the arm structure, and a nut 41 threaded onto said protruding section to hold the shaft in place on the arm structure.

* * * * *